(12) United States Patent
Mehio

(10) Patent No.: US 10,039,317 B1
(45) Date of Patent: Aug. 7, 2018

(54) HOOKAH

(71) Applicant: Mya Saray, LLC, Sterling, VA (US)

(72) Inventor: Nizar Youssef Mehio, Tallet El Khayet (LB)

( * ) Notice: Subject to any disclaimer, the term of this patent is extended or adjusted under 35 U.S.C. 154(b) by 0 days.

(21) Appl. No.: 15/485,547

(22) Filed: Apr. 12, 2017

(51) Int. Cl.
*A24F 1/30* (2006.01)
*F16J 15/06* (2006.01)

(52) U.S. Cl.
CPC ............... *A24F 1/30* (2013.01); *F16J 15/06* (2013.01)

(58) Field of Classification Search
None
See application file for complete search history.

(56) References Cited

U.S. PATENT DOCUMENTS 5,908,031 A   6/1999   Clark
7,827,995 B2  11/2010  Chaoui

*Primary Examiner* — Michael J Felton
*Assistant Examiner* — Katherine Will
(74) *Attorney, Agent, or Firm* — Da Vinci's Notebook, LLC

(57) ABSTRACT

The present invention is directed to a hookah that utilizes a new type of hookah stem. Preferred hookah embodiments of the present invention provide a joinder without the use of traditional threading, yet may still employ a rotational-based sealing method. Hookahs of the present invention offer a superior seal while utilizing a highly-advantageous manufacturing technique that obviates the need for high-precision, small negative spaces.

15 Claims, 16 Drawing Sheets

HOOKAH

FIELD OF THE INVENTION

The present invention relates to the field tobacco smoking devices and more specifically to the field of hookahs.

BACKGROUND

Of the many proud traditions of Ottoman culture, few have achieved the world-wide fame of hookah smoking. Once confined to the Middle East and Near East regions, the hookah's notoriety was invigorated by Napoleon's invasion of Egypt and the stream of curious Westerners which followed thereafter. Painters, such as Eugene Delacroix and Jean-Leon Gerome, when depicting Oriental styles typically included a hookah as a symbol of the depicted culture. The hookah was elevated from a regional curiosity to a universal symbol of sophistication.

The hookah, which has maintained a constant popularity in the Middle East, presently enjoys in American culture a unique, niched function. Hookah smoking combines community and relaxation into a single event. Rarely does one witness a group smokers crowded about a single cigarette, cigar, or pipe. Though hookahs are often designed with a single smoke outlet; the presence of multiple hoses, each capable of simultaneous use, emanating from a single smoking instrument is unique to the hookah. Multiple hose hookahs form the centerpieces of hookah clubs in which hookah smokers gather to unwind and converse with other community members. A hookah combines fashion, art, and function into a single device.

A basic hookah includes a base, a pipe, at least one hose with a mouthpiece, and a bowl. The hookah bowl holds the hookah tobacco, frequently "massell." Massell is a mixture of tobacco, molasses, and often a flavor or fruit extract. The molasses and fruit extract add a substantial amount of moisture to the massell that is missing in conventional tobacco. This added moisture makes massell more sensitive to the elements relative to conventional tobacco; prolonged exposure to air evaporates much of the moisture of massell and reduces its flavor. When properly protected, massell allows a smoker a more recreational, flavored smoke than the tobacco of cigars, cigarettes, pipes, and the like. An experienced hookah smoker will know to loosely distribute massell into a pile within the hookah bowl to allow heat to evenly circulate through the pile.

The heat that ignites the massell derives from coals positioned above the hookah bowl. The coals and massell preferably never contact one to the other. A common method of placing coals proximate to the massell involves spreading a foil upon the top of a hookah bowl, punching holes in the foil, and then placing the coals onto the foil. The heat from the lighted coals travels through the holes in the foil to ignite portions of the massell. Particulates from the massell travel in the smoke created by the ignition down through the hookah bowl into the hookah pipe.

The hookah pipe is the body of a hookah and is usually fabricated from brass, tin, or stainless steel. The pipe transports the massell smoke from the bowl to the hookah base, which is a cavern containing water. The base of the hookah is typically fabricated of glass or plastic and tends to be the most expressive portion of the hookah, ranging from translucent to wildly-colored. Within the cavern of the hookah base, the massell smoke is cooled by the water within. The cooled massell smoke then returns to the back to the pipe, though not through the same entrance by which the massell smoke enters the base. From the pipe, the massell smoke travels through the hose and out of the mouthpiece.

There are presently two prominent versions of hookah structures: the Lebanese style and the Egyptian style. Although the aficionado will explain that there are many differences between the two styles, the practical layman would quickly note the obvious difference: the connection point between the pipe and the hookah bowl. The Egyptian style hookah pipe tapers upward into what is generally referred to as a male connection. The Egyptian style hookah bowl includes a female connection which receives the pipe's male connection. In the Lebanese style hookah the bowl has the tapered male connection and the pipe has the female connection to accept the Lebanese style hookah bowl. In both styles, to allow a more airtight connection a collar is generally added to fit around the male connection.

Manufacturing a premium quality hookah having a durable construction can be problematic. Hookahs operative in a highly corrosive atmosphere; the interior of a hookah usually is in contact with liquid water, water vapor, and gaseous tobacco (and byproducts of the smoking product), and combustion gases. The materials from which premium hookahs are manufactured should be resistant to these effects to the greatest extent possible, and the hookah components made therefrom should be configured to maintain the high standards of operational efficiency. One of the best ways to seal a hookah's internal spaces is through the use of threaded connections; however, threading consumes a significant amount of fabrication time and cost. Mating threads with tight tolerances ensures the greatest degree of seal, but as the tolerances become more and more stringent, debris within the threading apertures (and between the protruding threading) interferes with the connection. Therefore there is a need to fabricate hookahs utilizing a secure, efficiently-sealed connection that eliminates to the greatest degree possible the expenses associated with high-tolerance threading and the deleterious effects of hookah debris on inter-component connections.

SUMMARY

The present invention is directed to a hookah that utilizes a new type of hookah stem. The hookah includes a hookah bottle, which is often constructed of one material, usually a translucent material such as glass or plastic. The hookah bottle includes a hookah neck.

The hookah stem includes a neck stem segment and a free stem segment. The neck stem segment is created to be affixed to the hookah bottle neck. The free stem segment is created to be affixed to the neck stem segment. In a preferred embodiment, a neck stem includes an external configuration that forms a seamless, flush, and continuous connection with multiple free stem segments such that a standard neck stem can be applied to multiple hookahs—or a user can change hookah designs at her discretion. A user with such an embodiment may be able to acquire a hookah base with a standardized neck portion affixed to a bottle, and then review a multitude of free stem segment designs and configurations.

The neck stem segment is overlaid upon the neck. The neck stem segment includes a neck shoulder, a neck stem major sidewall, and a neck stem minor sidewall. The neck stem major sidewall contacts the hookah bottle and is viewable from an external observation point, and depending on the version of the present invention, may be above or below the neck stem minor sidewall. The neck stem minor sidewall includes at least two angled neck protrusions, that unlike threading, are not required to circumscribe the sidewall.

The free stem segment includes a free stem floor, a free stem major sidewall, and a free stem minor sidewall. The free stem major sidewall is viewable from an external observation point, and the free stem minor sidewall includes at least two angled stem protrusions, that unlike threading, are not required to circumscribe the sidewall.

The use of the two sets of protrusions have multiple advantages, including that negative space bored within the sidewalls is not required. Because the stem of the present invention does not rely on the protrusions to form the point of sealing, the size of the protrusions has minimal direct correlation to the efficiency of the seal between the components. Instead, the protrusions are primarily a device to urge sealing elements into close proximity. Furthermore, the necessity of negative space for threading has been obviated. The protrusion sets are complementarily angled such that the stem protrusions are positioned below the neck protrusions, and the stem protrusion slides upon the neck protrusions at the angle of their creation to longitudinally move the stem into a locked position. One of more sidewall portions of the stem may form the seal, or in a preferred version of the present invention, at least one seal is used between the neck and stem floor to form a seal between the internal space of the stem and the external environment.

These aspects of the invention are not meant to be exclusive. Furthermore, some features may apply to certain versions of the invention, but not others. Other features, aspects, and advantages of the present invention will be readily apparent to those of ordinary skill in the art when read in conjunction with the following description, and accompanying drawings.

DETAILED DESCRIPTION

Figure 1:
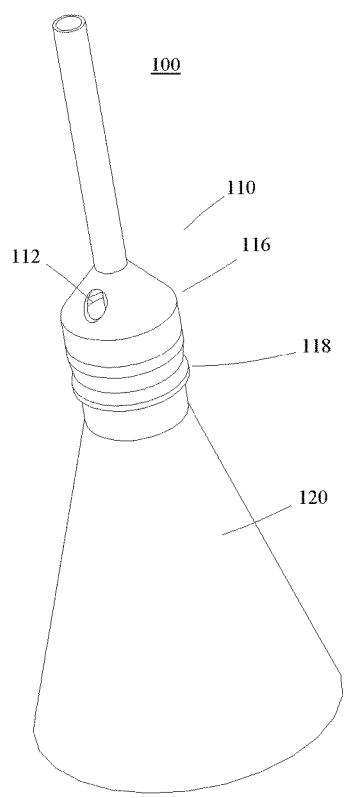
FIG. 1 is a perspective view of the hookah of the present invention.

Referring first to FIGS. 1-5, a basic version of the hookah 100 of the present invention is shown. The hookah includes a stem 110 configuration that is amenable to advantageous forms of construction and use.

FIGS. 1-5 depict an external stem version of the hookah 100 of the present invention. This version is so named because it can affix externally to a neck 122 of a hookah bottle 120. The particular affixation scheme employed by the present invention is not a restriction on the implementation of the invention. The hookah stem 110 includes a neck stem segment 118 and a free stem segment 116. The segments are so named because the stem is separable, with one portion, the neck stem segment 118, intended to be affixed (preferably permanently) to a hookah bottle neck 122, and the free stem segment 116, is intended to be releasably affixed to the neck stem 118.

Figure 6:
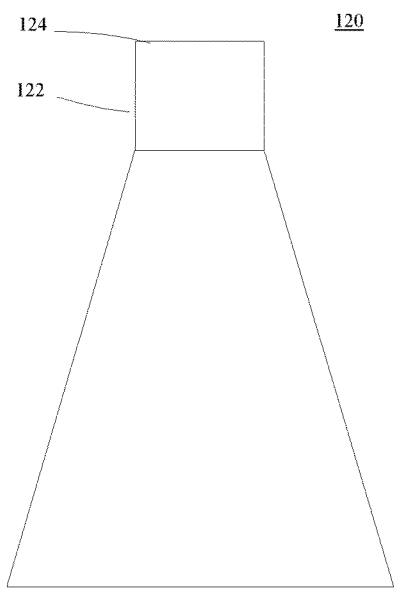
FIG. 6 is an orthogonal view of the bottle of the present invention.
Figure 7:
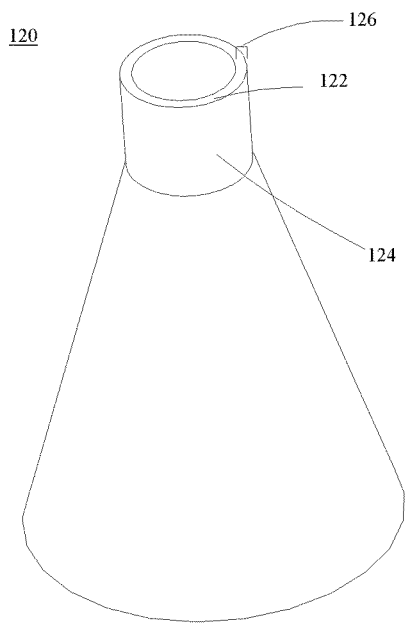
FIG. 7 is a perspective view of the bottle of the present invention.
Figure 8:
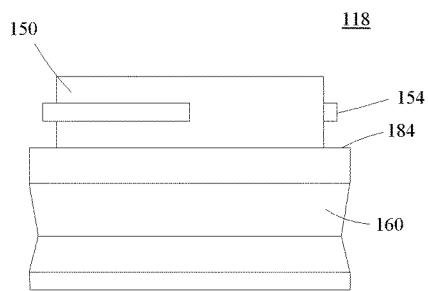
FIG. 8 is a side, orthogonal view of a hookah stem portion of the present invention.

Turning to FIGS. 6-7, the hookah bottle 120 of the present invention, sometimes referred to as a "hookah base," can be any design utilized in the hookah industry. As hookah bottles are often ornamental, generally any shape of hookah bottle 120 may be employed. The preferred hookah bottle 120 includes a bottle neck 122 with flush and substantially vertical sidewalls 126. The sidewall 126 of the hookah neck 122 is the wall formed by the material of which the hookah bottle neck is constructed. Hookah bottles, including necks, are generally constructed of one of more substantially translucent materials to permit a user to view the contents of the hookah bottle, including both the liquid and resulting smoke.

Translucent materials tend to be materials incapable of withstanding substantial strain, whether because of the inherent brittleness of glass or the pliability of plastics (which tend to mar the translucence upon disfigurement or scuffing). A hookah bottle neck may utilize a second material upon which to manufacture a joinder mechanism, such as threading. The present invention, rather than seeking to apply simply a sheet of a sturdier material, utilizes a portion of the stem to prepare the hookah bottle for use. Accordingly, the preferred hookah neck stem and preferred hookah bottle neck have a mating cross-section configuration.

In view of FIGS. 1-7, it can be seen that the cross-section of the bottle neck 122 and the cross-section of the neck stem 118 include a similar shape; as shown here, a circle with a flush vertical sidewall. Use of such a configuration conveys manufacturing benefits because bends, crevices, complicated polygons, and other non-symmetric shapes in glass can be a source of manufacturing complexity. The present invention obviates the necessity to manufacture self-locking shapes, e.g. polygons, for affixation of a component to a bottle neck 122 to create a hookah bottle 120 with a joining mechanism. Self-locking shapes may nonetheless be used with the present invention; their utility, however, is greatly diminished by the present invention. The present invention may utilize smooth sidewalls of the neck stem 118 and smooth sidewalls 126 of the hookah neck 122. The neck stem 118 is placed over, or in other versions of the present invention, within, the bottle neck 122 and the two components can be adhered into indefinite affixation. Alternatively, a hookah bottle neck may include releasable affixation means to affix the neck stem 118 to the hookah bottle neck for releasable affixation thereto, or may otherwise simple rely upon gravity. Premium hookah stems can be manufactured from high-grade metals with substantial weight and in many cases, gravity alone—or gravity in conjunction with close fitting components—will be sufficient to releasably affix a hookah stem to a hookah bottle in a secure fashion.

The neck stem 118 includes a neck stem major sidewall 160 and neck stem minor sidewall 150 formed by the material from with the stem 110 is created. The use of the terms "major sidewall" and "minor sidewall" are for explanatory purposes only, and for use in characterizing the invention in the clearest terms possible. In many instances, a major sidewall may not be distinguishable from a minor sidewall except along certain portions of the sidewall. There need not be a stark differentiation or demarcation point between the major sidewall and minor sidewall for this component, or any other component of the present invention. The neck stem major sidewall 160 is the portion of the neck stem that is externally visible to a user. The stem portions are meant to integrate into a single entity that is aesthetically complementary. Above the neck stem major sidewall 160 is the neck stem minor sidewall 150. In the version of the hookah 100 depicted, the minor sidewall 150 is positioned above the major sidewall 160 and the major sidewall 160 includes a width that extends beyond the minor sidewall 150. By width it is not meant the physical width of the material forming the sidewall, but rather than radial distance from a center point of the hookah to closest point on the sidewall. When one component's width is entirely less than the width of a second component, that smaller component is "bounded" by the larger component (which is what one would see from a longitudinal vantage point). It is preferred that the neck stem minor sidewall 150 is entirely bounded, i.e., at all points, by the neck stem major sidewall 160. The widths of these sidewalls form passages, a neck stem major passage 162 formed by the neck stem major sidewall 160 and a neck stem minor passage 152 formed by the neck stem minor sidewall 150.

Figure 9:
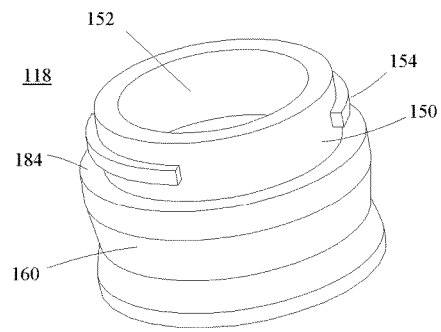
FIG. 9 is a perspective view of a hookah stem portion of the present invention.
Figure 10:
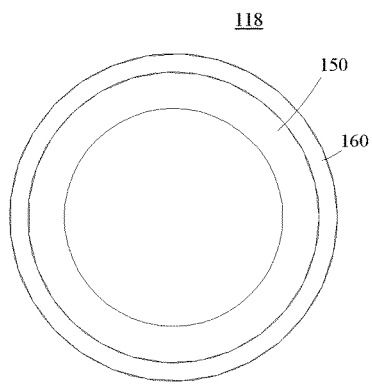
FIG. 10 is a bottom orthogonal view of a hookah stem portion of the present invention.
Figure 11:
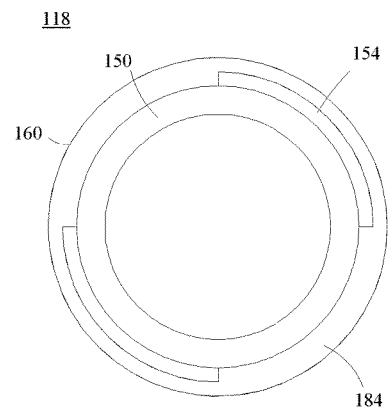
FIG. 11 is a top orthogonal view of a hookah stem portion of the present invention.
Figure 12:
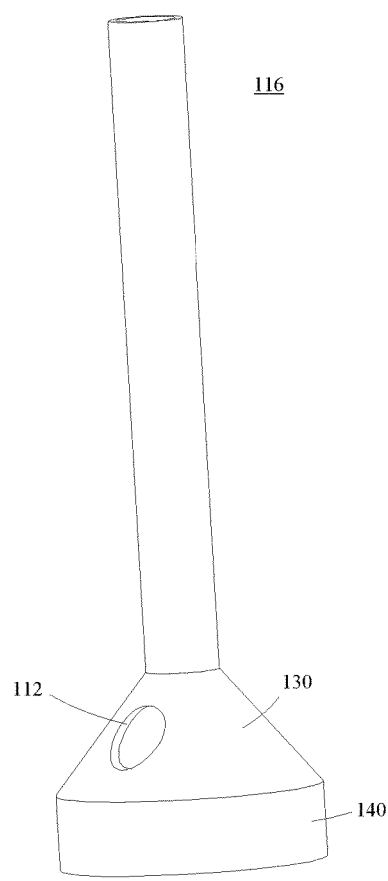
FIG. 12 is a perspective view of a hookah stem portion of the present invention.
Figure 13:
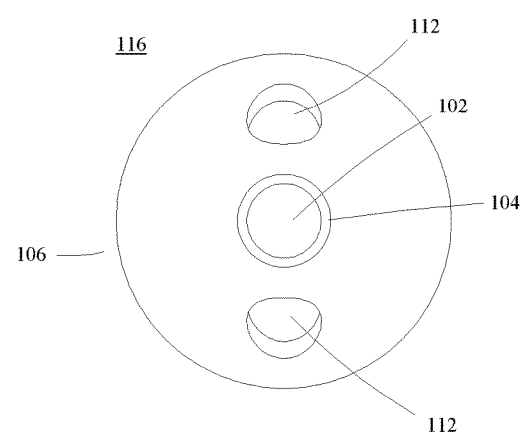
FIG. 13 is a top orthogonal view of a hookah stem portion of the present invention.
Figure 14:
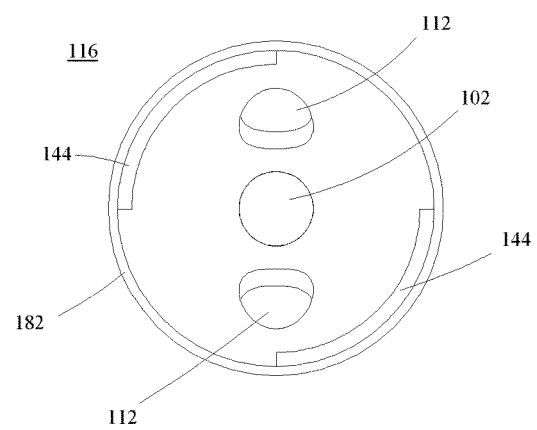
FIG. 14 is a bottom orthogonal view of a hookah stem portion of the present invention.
Figure 15:
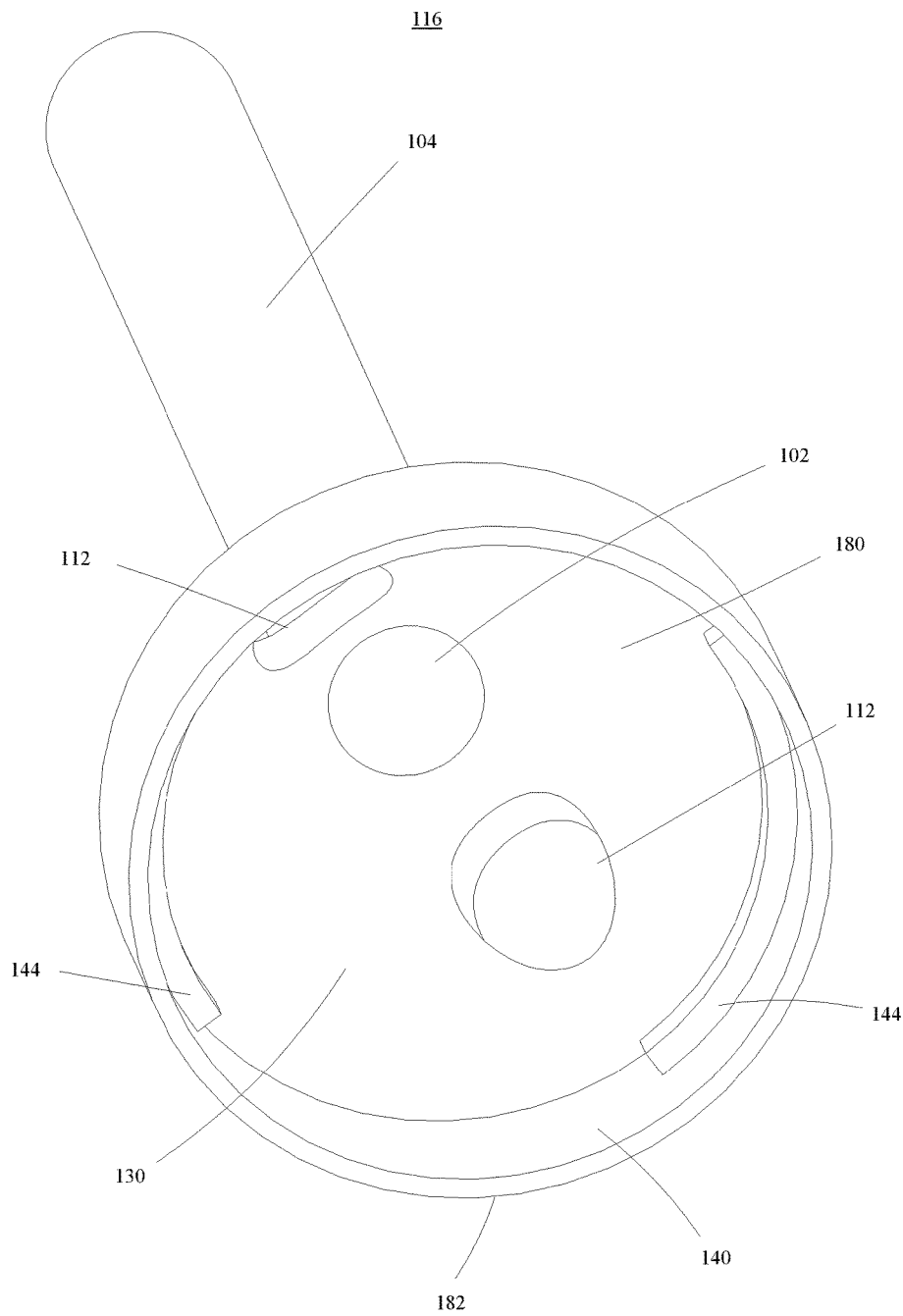
FIG. 15 is a bottom perspective view of a hookah stem portion of the present invention.

Turning now to FIGS. 6-11, the neck stem 118 major sidewall 160 protrudes beyond then neck stem minor sidewall 150. The minor sidewall 150 includes at least two neck protrusions 154 on the surface thereof. The neck protrusions 154 include an angled surface to act in the manner of threading when paired with complementary protrusions in the free stem (not shown). The neck protrusions 154 preferably jut a distance less than the furthest point of the major sidewall 160 of the neck stem 118. The neck stem 118 includes a lower portion, preferably formed by the major sidewall 160, configured to slip upon the smooth outer surface of a bottle neck 122 and rest atop the apex 124 of the bottle neck 122. In the embodiment of the neck stem 118 of FIG. 10, it can be seen that the space between the major sidewall 160 and the minor sidewall 150 forms a lower ceiling onto which the apex 124 of the hookah bottle 120 may attach. Otherwise, the major sidewall 160 and the minor sidewall 150 need not include comparable dimensions; indeed, it is preferred that they do not. As can be seen in FIG. 9, the major sidewall 160 extends beyond the minor sidewall 150 to form a neck stem shoulder 184. This is preferred so as to provide a plane upon which the free stem may rest.

Returning to FIGS. 1-7 and in further view of FIGS. 12-15, the present invention further includes a free stem 116. The free stem 116 is the segment of the stem 110 that is releasably affixed to the neck stem 118. The free stem 116 includes a major sidewall 130 and a minor sidewall 140. The major sidewall 130 is the portion of the free stem sidewall that is visible to an external observer. The minor sidewall 140 is the portion of the free stem sidewall that contains affixation means for the attachment of the free stem 116 to the neck stem 118. The stem 110 includes an internal plenum 180, which is the component of the stem whereby dry and wetted smoke are both available at a similar elevation—although preferably not mixed. In other words, if a cross-section of the plenum 180 were taken and viewed form a longitudinal observation point, dry smoke would be on the same plane as wetted smoke. The preferred plenum of the present invention utilizes the configuration described by U.S. Pat. No. 8,001,978, the disclosure of which is hereby incorporated by reference herein. In such a configuration, a down tube 108 is affixed to the ceiling of the plenum 180, whereby a dry smoke aperture 102 brings dry smoke from a bowl down a stem tower 104 to the ceiling of the plenum 180. The down tube 108 is connected to the ceiling of the plenum at the point at which the dry smoke aperture 102 terminates. The dry smoke aperture 102 is continued through the down tube 108 until the dry smoke is released into the interior of the hookah bottle 120. Thus the dry smoke is cordoned off from the wetted smoke, which generally fills the plenum except for the space within the down tube 108. The plenum 180 further leads to the wet smoke outlet 112. The wet smoke outlet of the present invention is the egress point at which wetted smoke leaves the stem proper to flow into a hookah hose, a receptacle to which a hookah hose is attached, or some other hookah component that further shunts wetted smoke toward a user. The wet smoke outlets may further utilize sealing mechanisms as taught by U.S. Pat. No. 8,573,229, the disclosure of which is hereby incorporated by reference herein. Furthermore, the stem 110 may include any number of segmentations, or down tube positions, or other stem configuration not interfering with the operation of the present invention for its intended purposes; such as is disclosed in U.S. Pat. No. 7,806,123, the disclosure of which is hereby incorporated by reference herein.

Figure 16A:
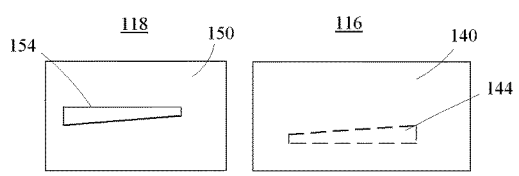
FIGS. 16A-16C depicts through side orthogonal views, the joinder of hookah stem portions of the present invention.
Figure 17A:
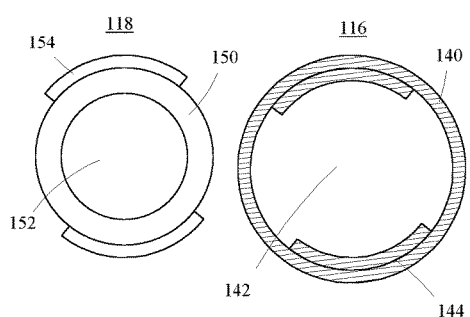
FIGS. 17A-17C depicts through top orthogonal views, the joinder of hookah stem portions of the present invention.
Figure 16B:
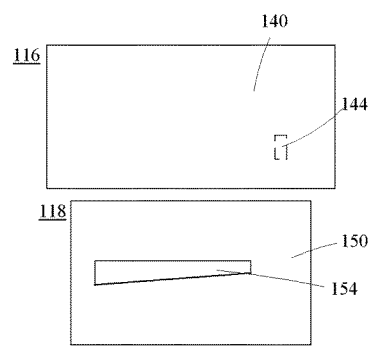
Figure 17B:
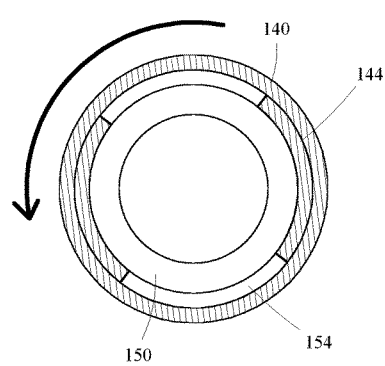
Figure 16C:
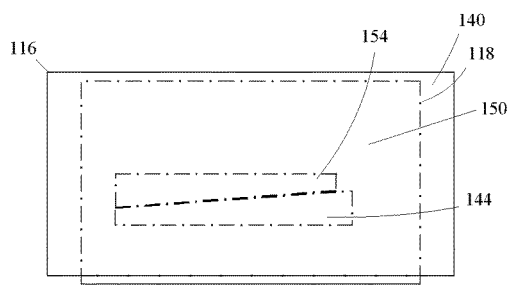
Figure 17C:
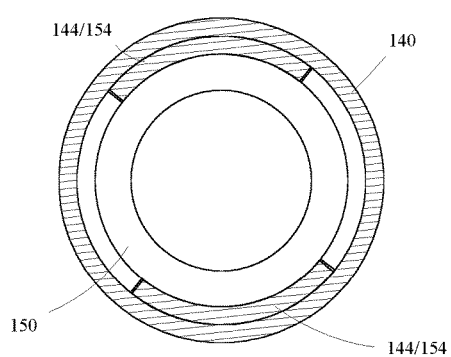
Figure 18:
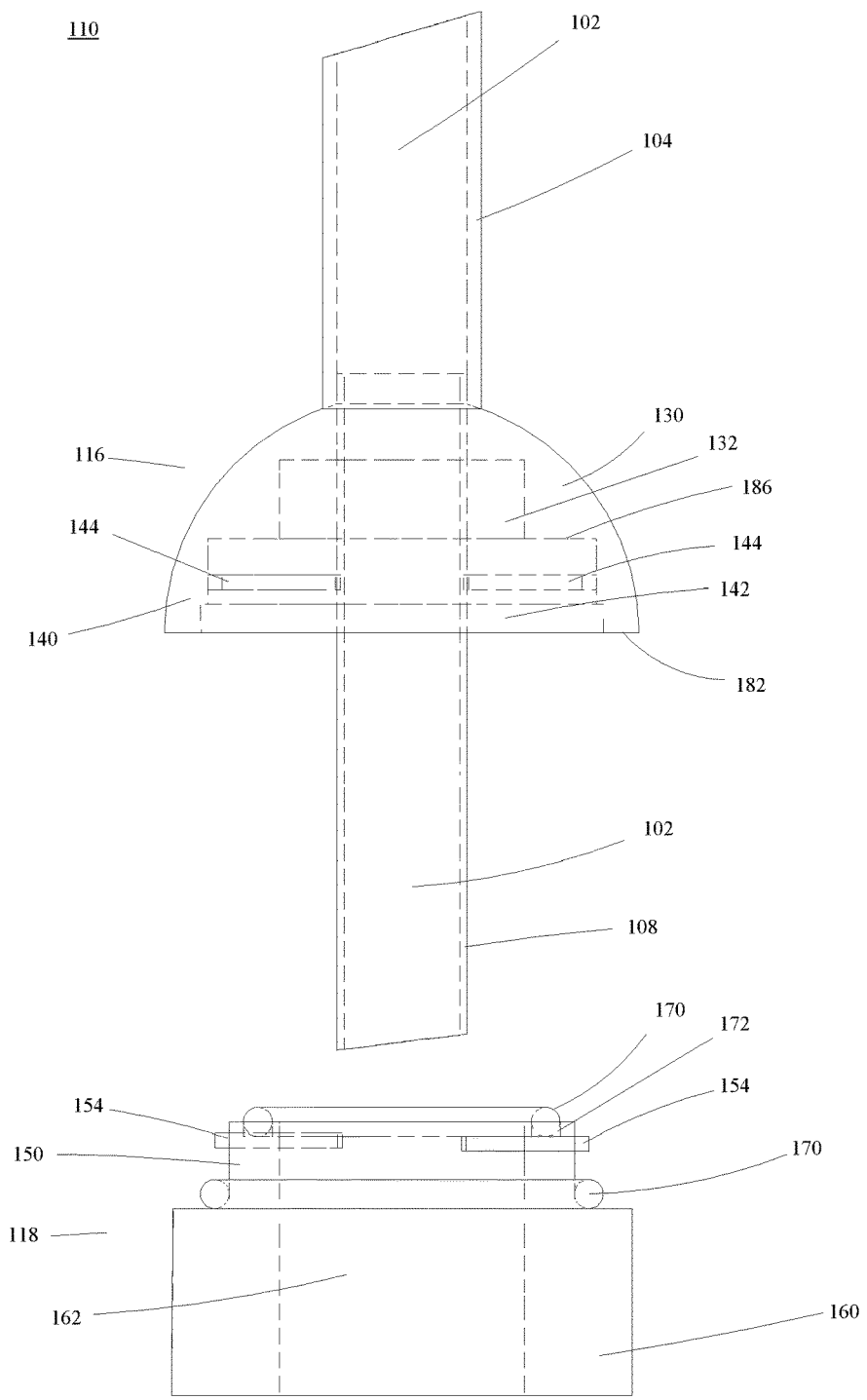
FIG. 18 is a revealed, orthogonal view of the hookah stem of the present invention.
Figure 19:
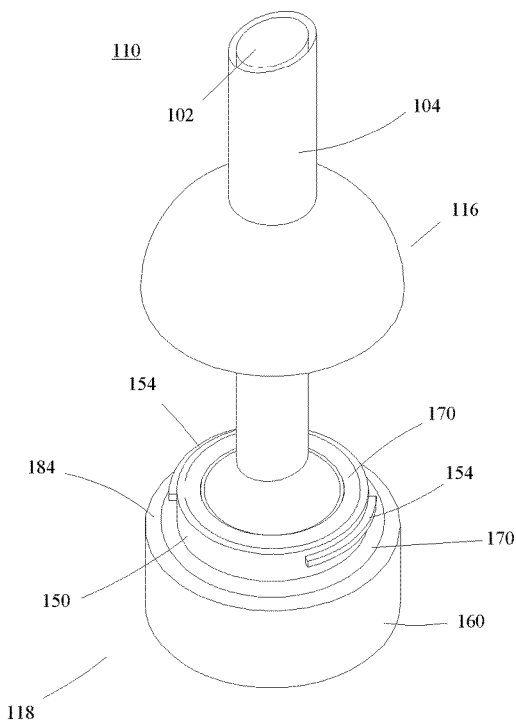
FIG. 19 is an upper, perspective view of the hookah stem of the present invention.
Figure 20:
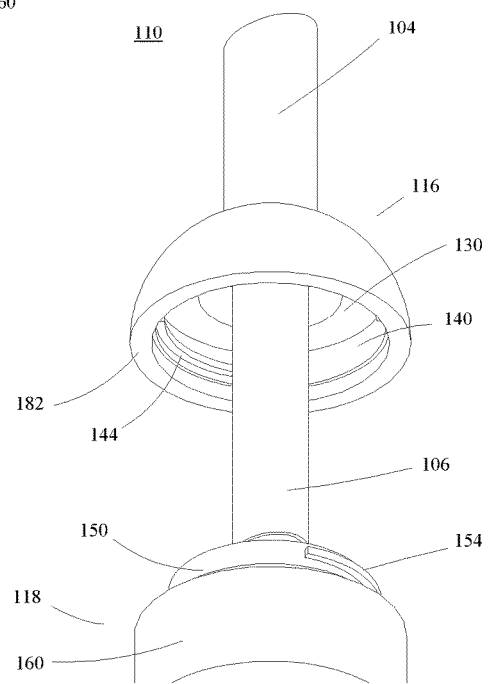
FIG. 20 is a lower, perspective view of the hookah stem of the present invention.
Figure 21:
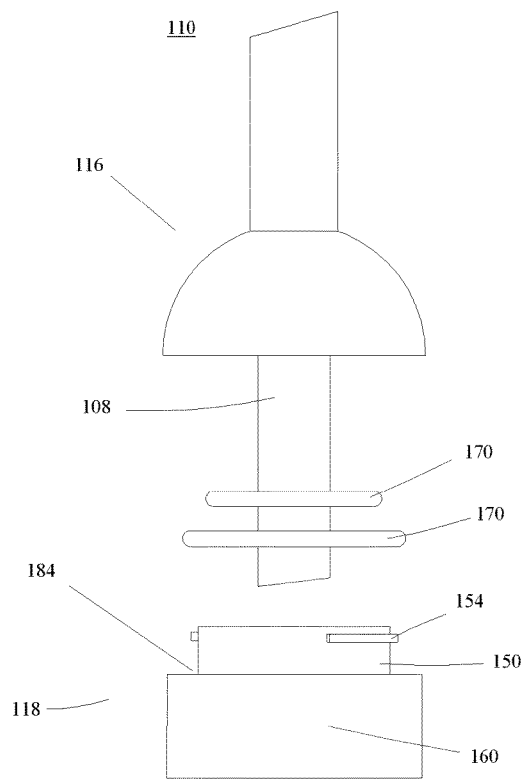
FIG. 21 is a side, orthogonal, exploded view of the hookah stem of the present invention.
Figure 22:
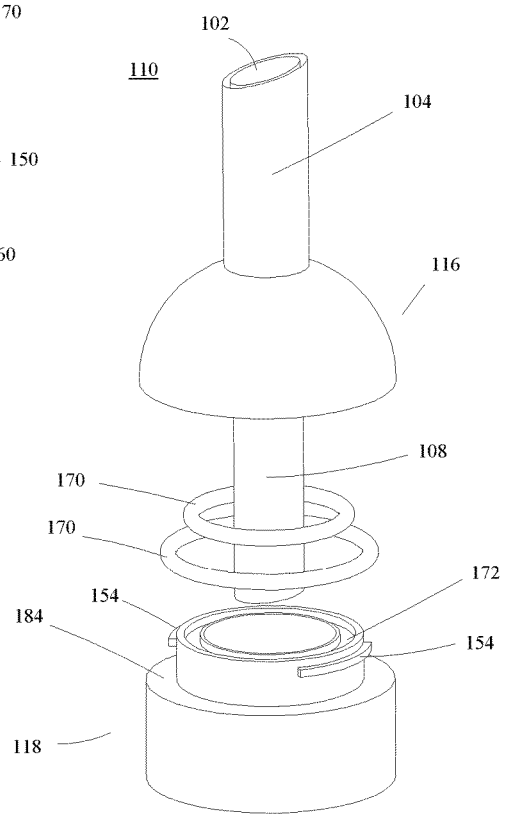
FIG. 22 is an upper, perspective, exploded view of the hookah stem of the present invention.

The plenum 180 contacts at least the major sidewall 130 in preferred versions of the present invention. The minor sidewall 140, in the embodiment of FIGS. 12-15, descends vertically from the major sidewall 130 and bears two stem protrusions 144. The stem protrusions, similar to the neck protrusions, are angled. As can be shown in FIGS. 16-17, the present invention achieves its fit through the use of only protrusions; protrusions are not inserted into a negative space as is the case of threading. Threading inserts positive space into negative space. Negative space, for purposes of the present invention includes a volume that is descended below two adjoining surfaces of similar height. As can be shown in FIGS. 16A and 17A, a minor sidewall 150 of a neck stem 118 and a minor sidewall 140 of a free stem 150 both bear mating protrusions 144, 154 respectively. There are at least two such protrusions 144, 154 for each of the sidewalls 140, 150. The total length of the protrusions preferably occupies less than half of the circumference, or perimeter depending on the geometric cross-section, of the minor sidewalls 140, 150. Turning now to FIGS. 16B and 17B, the free stem 116 is placed over the neck stem 118 and the stem segments are turned with respect to one another. In the preferred protrusion embodiments depicted in FIGS. 16-17, which bear only one angled surface (as opposed to say, parallel angled surfaces, which would also achieve the purposes of the present invention), the stem protrusions 144 are passed between the neck protrusions 154, and then turned so that stem protrusions 144 are pressed into contact with the neck protrusions 154. The angles of the stem protrusions create upon the application of radial, i.e. turning, force the longitudinal motion, i.e. downward motion, of the free stem 116 with respect to the neck stem 118. The stem protrusions preferably are constructed of a length and pitch such that the protrusions are aligned at the point in which the free stem 116 is seamlessly fitted upon the neck stem 118. Because the protrusions need not be the point of sealing, the protrusions need not extend to completely overlap; rather any overlap is more of a means of ensuring grip fidelity between the two protrusions. The protrusions, which were once complementary to each other, see FIGS. 16B and 17B, now align, see FIGS. 16C and 17C, and form a fit one atop the other. Gravity, or other precision manufacturing techniques may make such a fit suitable without recourse to other fit components; however, the preferred embodiment of the hookah stem 110 includes a compressible seal (not shown) to finalize the preferred sealed fit. The sealed affixation of the free stem 116 to the neck stem 118 for purposes, that is to say whereby by mating protrusions are placed atop each other, of the present invention is termed a "locked position."

The protrusions of the present invention are not threading. The protrusions do not continuously circumscribe the entirety of the stem. In the preferred embodiments of the present invention the protrusions of one stem component are placed beyond the protrusions of the other stem component. The protrusions of the present invention may also differ from threading in that the protrusions need not be layered. The threading of common jointed threading tends to involve multiple levels of interlocking threads, that is to say, threading bounded by threading bounded by more threading. In this way, threading acts as sealing. The protrusions of the present invention need not include more than one set of protrusions per surface from a longitudinal perspective; although protrusions on the same radial level is quite significant for purposes of stem attachment stability. To prevent unwanted torsion, the protrusions of one stem portion should be roughly comparable in size, dimensions, orientation, and material per surface. Different surfaces may utilize differing sizes, for example the protrusions on the free stem may include dimensions smaller than those of the neck stem. There may even be advantages in different sizings of protrusions, even whereby one protrusion set extends more than halfway about the perimeter of the stem surface. According the preferred version present invention, such protrusions would necessitate that the mating protrusions on the other surface are, together, equivalent to the difference of, or less than, the total perimeter less the combined total of the longer protrusions. It may be the case that the total length of protrusions for both surfaces of coupling surfaces is less than three quarters or even half of the perimeter of the surfaces bearing the protrusion (either).

It is preferred that merely one set of protrusions is utilized from a longitudinal perspective, and that the surfaces immediately surrounding the protrusions are identical in angle, depth (except when angled), and material. This is preferred, when a protrusion is viewed from above orthographically as a rectangle, on all four sides. Because the height of the protrusion above or below the seals need not be related to the efficiency in sealing, there will often be flush surfaces for the surfaces above and below the protrusions for a space significantly greater than the space occupied (again, orthographically from above) by the protrusion.

The preferred angle of the protrusion is dependent upon the material used as a seal, to the extent that one is used. A greater angle provides greater force upon joinder. To the extent that the seal is formed of highly durable and highly elastic material, a greater angle may be utilized. However, the preferred angle utilized with the protrusions of the present invention is slight. As the angle increases, the force attempting to dislodge the protrusions, one from the other, based on the coefficient of static friction between the materials forming the protrusions becomes greater. It is best to speak of the angle indirectly by the amount by which the joinder through the angle forces the stem components into each other, and the preferred degree of movement utilizing stainless steel stems and one rubber seal positioned between the floor of the free stem and an upper portion of the neck stem is approximately 3 mm. Experimental testing has shown the sufficiency of a hookah free stem having an interior diameter of approximately 57 mm and a neck stem having an exterior diameter of approximately 48 mm to achieve movement of approximately 3 mm utilizing protrusions on the neck stem portion of approximately 38 mm in length and jutting approximately 1.5 mm and having an entry side height of 1.5 mm and an opposite side height of 4.5 mm. Protrusions on the free stem portion are approximately 38 mm in length and jut approximately 1.5 mm and have an entry side height of 1.5 mm and an opposite side height of 1.5 mm. Experimental results indicate that angling on merely one set of protrusions on either the neck stem or the free stem is sufficient to generate adequate sealing of the present invention. The experimental seal lies between the minor and major sidewall of the neck seal, and is an O-ring of approximately 58 mm and a ring girth of approximately 3 mm. Thus, although a preferred embodiment utilizes multiple sets of angled protrusions, merely one set of stem protrusions may be angled because it is the angled motion that is the key to achieving longitudinal motion of one stem portion upon another. Furthermore, the portions of the sidewalls adjacent to the stem need not be precisely flush. Machining prototypes indicate that stem protrusions having a raised surface in radial alignment with the protrusions exhibit little to no ill effects, indicating that the greatest significance lies in the prominence of the protrusions with respect to the sidewalls generally. The uniformity of sidewall flushness radial to the protrusions, and less so, below and above the protrusions exhibits minimal ill effects.

Figure 2:
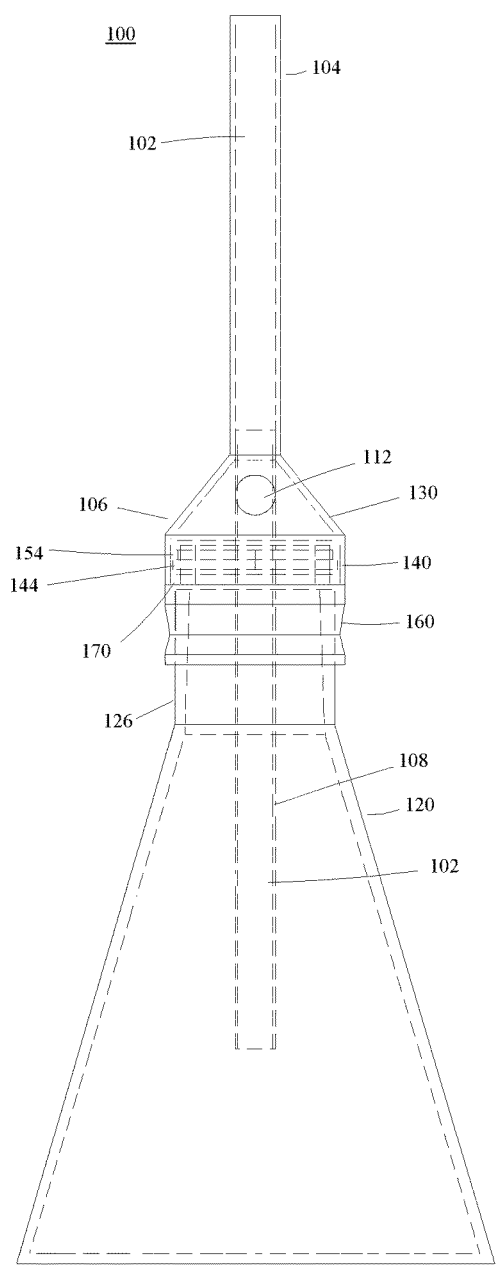
FIG. 2 is a revealed view of the hookah of the present invention.
Figure 3:
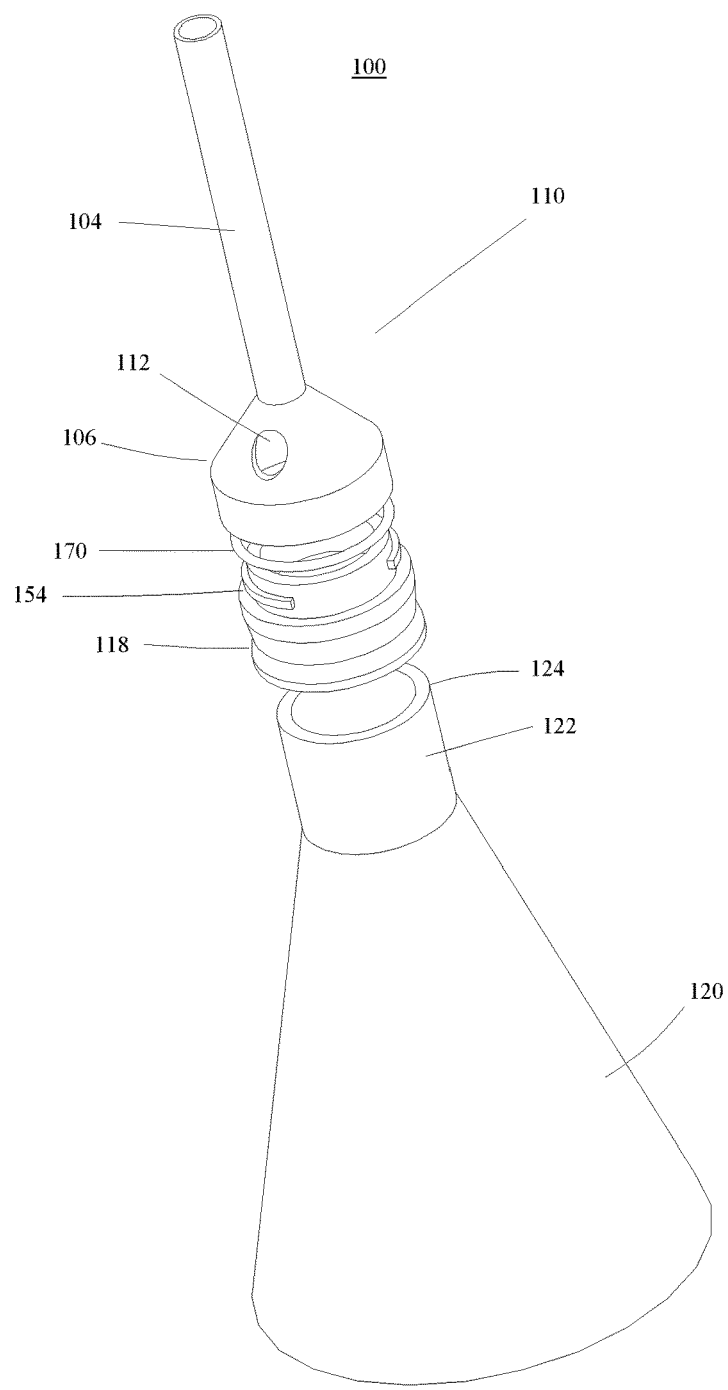
FIG. 3 is an exploded view of the hookah of the present invention.
Figure 4:
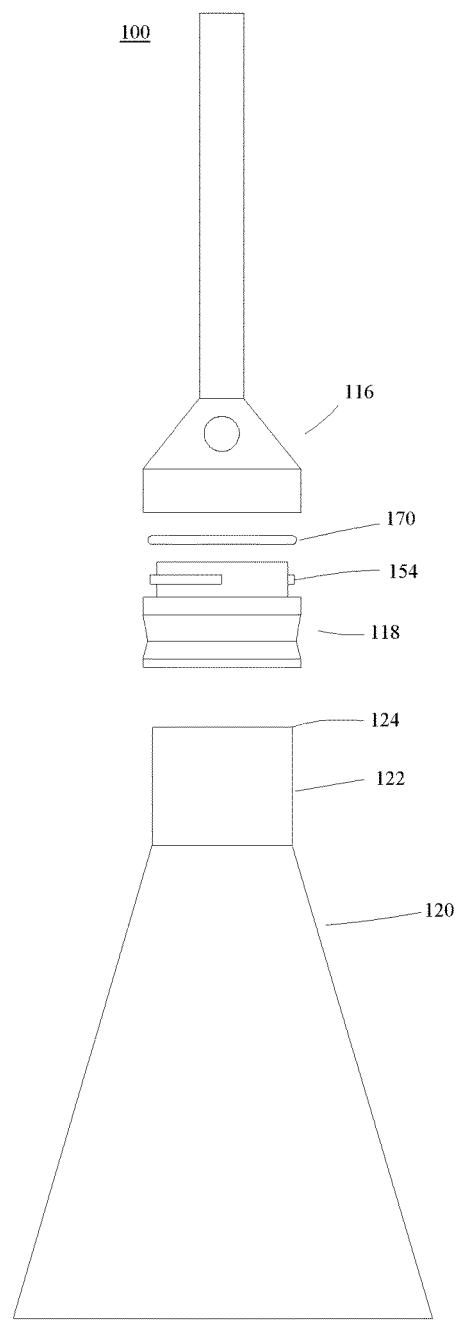
FIG. 4 is an exploded view of the hookah of present invention.
Figure 5:
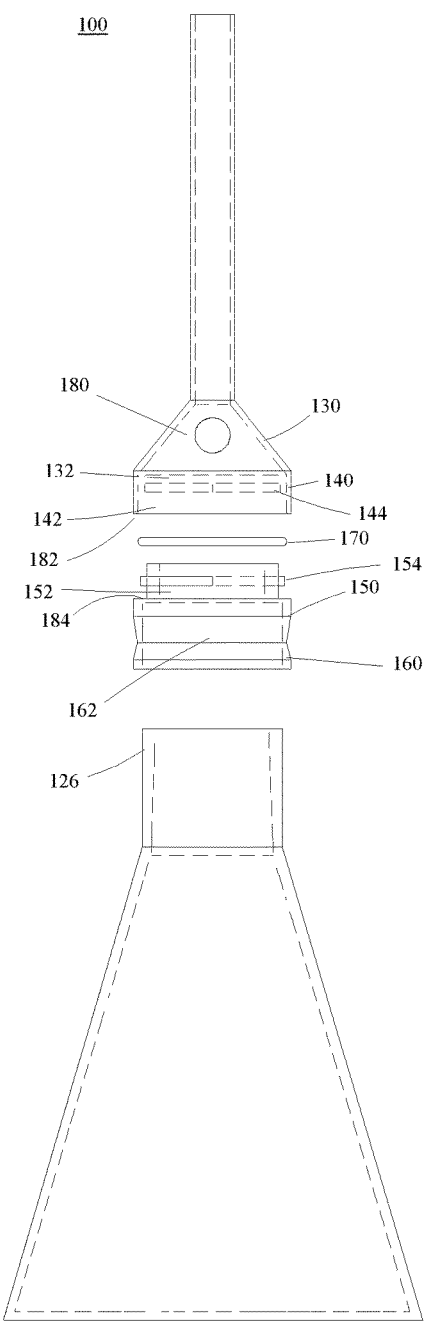
FIG. 5 is an exploded, revealed view of the hookah of present invention.

Returning to FIGS. 1-5, and 12-15 the preferred present invention 100 utilizes one or more elastic seals 170 to achieve a superior fit that is one of the advantages of the present arrangement. The fit previously described relied on gravity and friction for retention of the stem protrusions 144 about the neck protrusions 154. The preferred embodiment features a compressible seal placed below the point of fit between the stem protrusions 144 and the neck protrusions 154 for two purposes. The first purpose of the seal of the present invention is to seal. This attribute may be utilized by multiple seals known in the art. However, the seal of the present invention renders a second service to the releasable attachment of the free stem 116 to the neck stem 118: upon joinder of the protrusions 144,154, the elasticity of the seal applies a longitudinal force that pushes the protrusions to magnify the frictional effects between the protrusions. Joinder of the stem by turning one protrusion to be on top of the other provides sufficient force to create the locked position notwithstanding resistance from the seal; and when the protrusions are in their locked position, the resistance from the seal pushes the protrusions into each other. The preferred material of construction of the stem is a stainless steel; the preferred material of the compressible stem is a rubber as fashioned into a washer or O-ring. The preferred seal is further dimensioned to present not only on longitudinal force, but also a radial force between the free stem minor sidewall and the neck stem minor sidewall. The preferred placement of the compressible seal 170 is directly between the neck seal major sidewall 160 and the neck stem minor sidewall 150 on the further interior of the shoulder 184. The free stem 116 includes a stem floor 182 that results in a sealed fit between the stem floor 182 and shoulder 184. Where the free stem major sidewall 130 and free stem minor sidewall 140 result in free stem major passages 132 (the space between the free stem major sidewalls 130) comparable in width to the free stem minor sidewall passages 142 (the space between the free stem minor sidewalls 140), the point of sealing will generally be at the compressible seal as shown in FIG. 2.

The seal of the present invention can include one or more sealing devices as are commonly used in the art. In the present invention, and as elsewhere discussed, the seal does more than simply "seal" the invention. The elasticity of a member would play a significant role in the present invention in conjunction with the protrusions by its function of providing elastic resistance. When the seal is placed between the bottle and the stem or between two stem portions in a shoulder 184 type position, the elasticity of the seal provides resistance longitudinally along the hookah. When doing so, the resistance partly works against the friction between the mating protrusions when in a locked position. In several instances of the present invention, such a force vector may be advantageous. A preferred version of the present invention utilizes the seal to provide a radial, i.e. outward force, rather than a longitudinal force. In such instances, contact force between the free stem portion and the neck stem portion creates a second force that assists in maintaining the locked position. This resistance thus works to aid the protrusion-protrusion contact resistance and force from the elastic seal resists radial movement. These two sources of closure work together to achieve a seal not otherwise achievable.

Another embodiment of the hookah stem 110 of the present invention is depicted in FIGS. 18-25. In FIGS. 18-25, the free stem major passage 132 and the free stem minor passage 142 include substantially different dimensions. Indeed, there is a discontinuity between the free stem minor sidewall 140 and the free stem major sidewall 130 that results in a free stem minor ceiling 186. The free stem minor ceiling 186 is so named because the preferred configuration of the free stem 116 already includes a ceiling at the apex of the plenum 180 which is the point of attachment for the down tube 108. Thus, there may be a lower, "minor," ceiling in the stem 110. This configuration is advantageous because it permits a second potential for sealing the hookah stem 110. The hookah stem may already include an elastic seal positioned below the neck protrusions 154 for purposes of sealing and maintaining the locked position of the hookah stem. The hookah stem may feature a differently-situated or second, differently-situated compressible seal adapted to engage the minor ceiling 186 or other surface of the hookah stem. The advantage of the second, or differently-situated, stem seal 170 is for purposes of affixation integrity. One of the great problems associated with threaded sealing is the accretion of debris in the negative spaces of threading or groove-and-channel locks. Smoking a hookah creates a significant amount of debris within the body of the hookah. Because this debris is wet, and threading is often exposed to wetted smoke, rather than dry smoke, the debris takes the shape of the negative space because it is deformable. Debris weakens a seal when it prevents a positive surface from moving within a negative surface or creates spacing between the positive and negative spaces that were meant to be complementary. Even if regularly maintained, debris presents significant cleaning challenges in confined spaces—this is one reason why, even with the advantages of the present invention, the external neck stem embodiment is preferred: no protrusions are positioned within the hookah bottle. One or more of the compressible seals may be positioned with a seal channel 172 to further enhance the seal of the present invention. The seal channel may be positioned, not to provide longitudinal resistance between the stem and the bottle (relatively), but rather radial resistance between one stem portion and a second stem portion. Preferred channels 172 for providing such advantageous resistance includes a recessed channel radially on the same surface, but above and/or below, protrusions.

Figure 24:
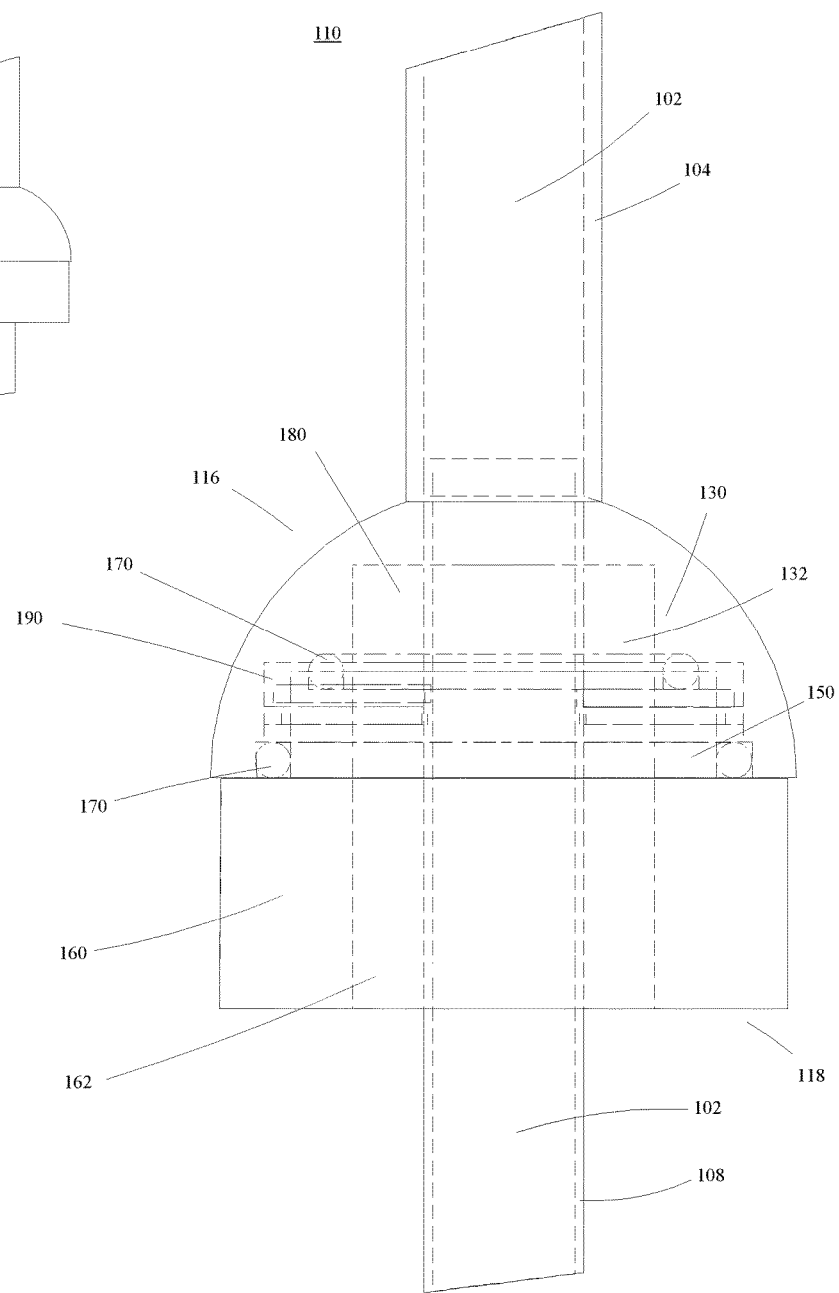
FIG. 24 is a side, orthogonal, revealed view of the hookah stem of the present invention.
Figure 25:
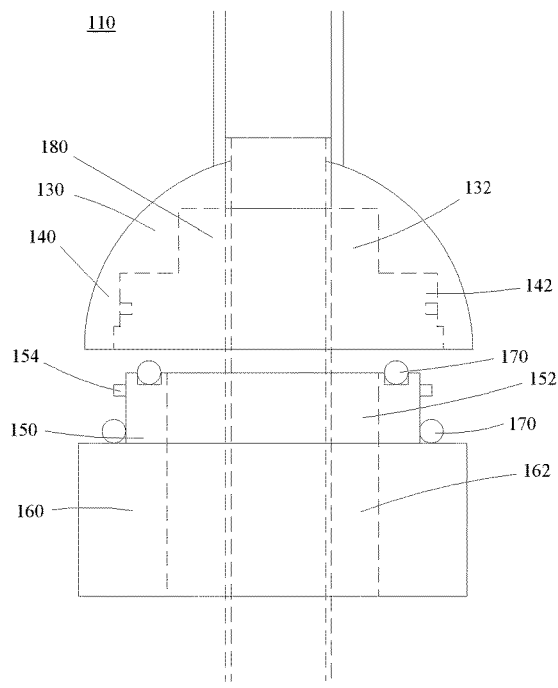
FIG. 25 is a side, orthogonal, revealed view of the hookah stem of the present invention.
Figure 26:
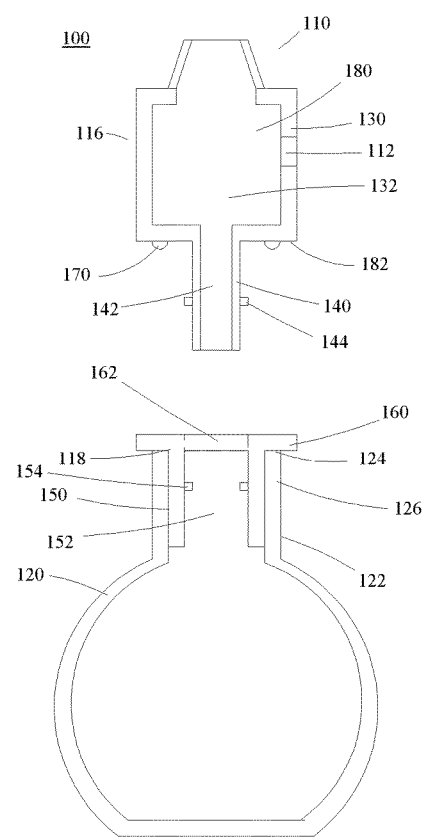
FIG. 26 is a side, orthogonal, revealed view of the hookah of the present invention.
Figure 27:
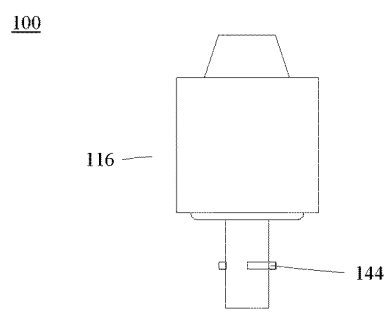
FIG. 27 is a side, orthogonal view of the hookah of the present invention.
Figure 28:
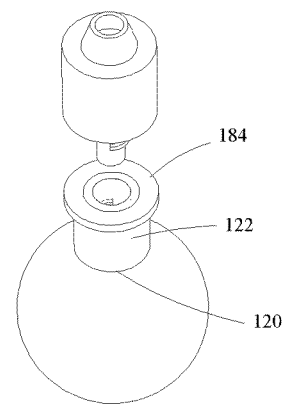
FIG. 28 is an upper, perspective view of the hookah of the present invention.
Figure 29:
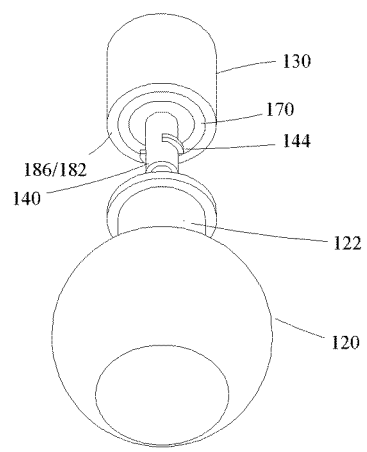
FIG. 29 is a lower, perspective view of the hookah of the present invention.
Figure 29:
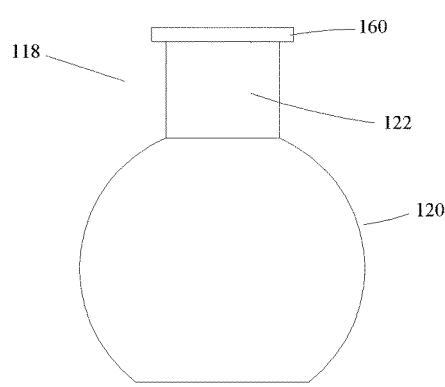
Figure 30:
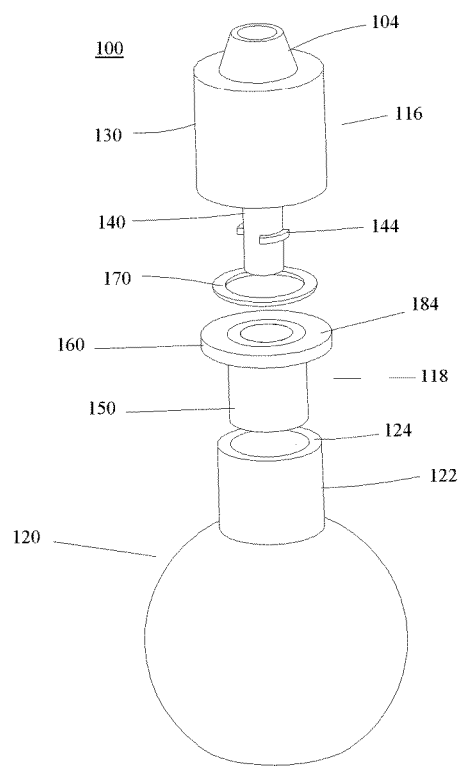
FIG. 30 is an upper, perspective, exploded view of the hookah of the present invention.
Figure 31:
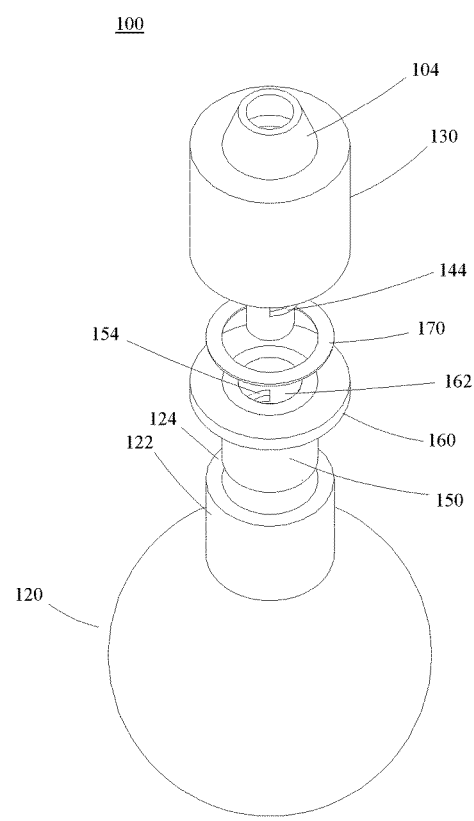
FIG. 31 is an upper, perspective, exploded view of the hookah of the present invention.
Figure 32:
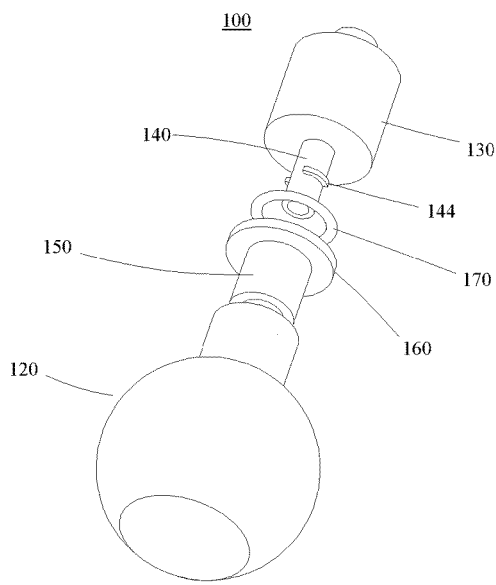
FIG. 32 is a lower, perspective, exploded view of the hookah of the present invention.
Figure 33:
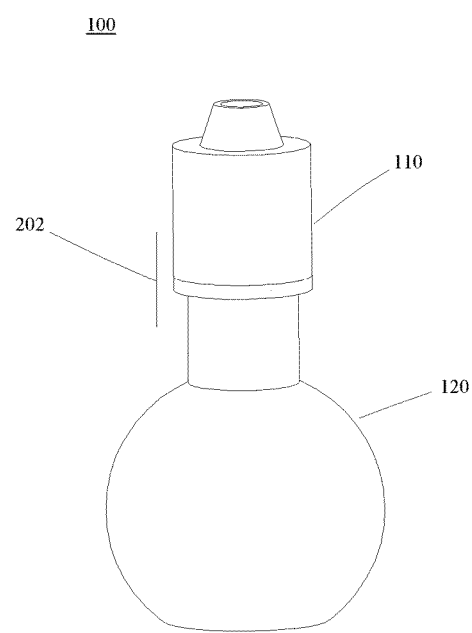
FIG. 33 is a perspective view of the hookah of the present invention.

As shown in FIG. 24, the protrusions are joined between a seal 170 below them and a seal 170 above them. The lower seal 170 provides a seal to the outside environment, which may include debris of its own, while the upper seal 170 provides a seal to the plenum 180 of the hookah stem 110. The protrusions are thus sealed in what can be conceptually described as a "protrusion chamber" 190 that is substantially immune from environmental and wetted smoke debris. In such an arrangement, the protrusions may be nearly immune from contamination. The characteristics of the protrusion chamber are such that the volume of space containing the joining protrusions includes a barrier to both the outside environment and the interior smoke conduction volumes of the hookah.

Figure 23:
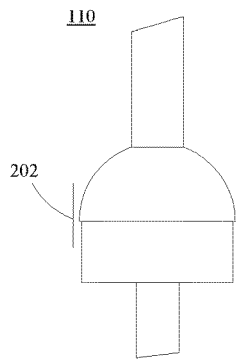
FIG. 23 is a side, orthogonal view of the hookah stem of the present invention.

As shown in FIGS. 23-24, the neck stem 118 is pressed upon the free stem 116, a flush continuous joinder 202 is presented. It is an advantage of the present invention that the neck stem 118 may be used with one or more complementary free stems 116. It is preferred that the point of the sidewall 150/160 of the neck stem that is external and closest to the sidewall 130/140 of the free stem form a continuous joint. By continuous it is meant that the external sidewall of the free stem 116 not present a configuration disconcerted from the external sidewall of the neck stem 118. Concerted configurations may be a shape that forms a part of a surface detail, continues a planar surface (or is close enough to be visibly similar from the standpoint of an observer from across a room), forms a logical continuation of a sidewall design (e.g., is the vertex of a triangular groove, forms a continuous sinusoidal groove, presents a jointly-tapered surface, etc.).

A concerted configuration may also include any joinder whereby the point of the sidewall 150/160 of the neck stem that is external and closest to the sidewall 130/140 of the free stem have a radius within 10% of each other.

Turning now to FIGS. 26-33, an inner neck stem embodiment of the hookah 100 of the present invention is depicted ("insert embodiment"). In the insert embodiment, the major sidewall 130 of the free stem 116 is positioned above the minor sidewall 140 of the free stem. The free stem minor sidewall 140 includes a minor sidewall passage 142 smaller than the major sidewall passage 132, at least at the point where the passages meet (or are indistinguishable). The free stem minor sidewall is dimensioned to be placed within a neck 122 of a hookah bottle 120.

The neck stem 118 of the insert embodiment includes a major sidewall 160 positioned above the minor sidewall 150. The minor sidewall 150 is inserted within the bottle neck 122, and preferably permanently adhered to the side thereof. The interior of the minor sidewall 150 includes neck protrusions 154 adapted to accept the stem protrusions 144 of the free stem 116. Turning the stem protrusions 144 about the neck protrusions 154, brings the free stem 116 into contact with the neck stem 118, the free stem floor 182 (which because of the discontinuity between the minor sidewall 140 and the major sidewall 150 also forms a minor ceiling 186) into contact with the neck stem shoulder 184. Here, the seal 170 would be positioned above the protrusion 144, 154 joinder to prevent the ingress/egress of gases, etc. It is preferred in the insert embodiment that the shoulder of the neck stem form a 'T' shape whereby which the major sidewall 160 extends beyond the bounds of the bottle neck 122 and its sidewall 126. The neck stem may be placed upon the apex 124 of the bottle neck 122 and the minor sidewall 150 thereof may be adhered to the inner surface of the bottle neck 122. The locked position of the free stem 116 to the inner stem presents the joiner 202 that is continuous.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

INDUSTRIAL APPLICABILITY

The present invention is directed to a hookah that utilizes a new type of hookah stem. Preferred hookah embodiments of the present invention provide a joinder without the use of traditional threading, yet may still employ a rotational-based sealing method. Hookahs of the present invention offer a superior seal while utilizing a highly-advantageous manufacturing technique that obviates the need for high-precision, small negative spaces.

What is claimed is:

1. A hookah comprising:
  a hookah bottle constructed of a first material and having a bottle neck width;
  a hookah stem, constructed of a second material different from said first material, comprising:
    a neck stem segment, overlaid upon said neck, comprising: a neck stem major sidewall greater than said bottle neck width defining a neck shoulder and defining a neck stem major passage with a neck stem major passage width; and a neck stem minor sidewall entirely bounded by said neck stem major sidewall, positioned above said neck stem major sidewall, defining a neck stem minor sidewall passage having a neck stem minor sidewall width, and defining at least two neck protrusions, each having a neck protrusion total length, partially circumscribing less than half of a whole of said neck stem minor sidewall; and
    a free stem segment, comprising: a free stem floor; a free stem major sidewall, having a free stem major sidewall passage with a free stem major sidewall passage width, defining an internal plenum and a wet smoke aperture; a free stem minor sidewall, positioned below said free stem major sidewall, defining a free stem minor passage having a free stem minor sidewall passage width, defining at least two stem protrusions, of a stem protrusion total length, partially circumscribing less than half of a whole of said free stem minor sidewall,
    wherein angled radial actuation, of distance less than said stem protrusion total length and said neck protrusion total length, of said stem protrusions below and upon said neck protrusions longitudinally motions said free stem floor into contact with said neck shoulder into a locked position.

2. The hookah of claim 1 further wherein said free stem major sidewall passage width is no greater than said free stem minor sidewall passage width to form a discontinuous stem minor ceiling between said free stem minor sidewall and said free stem major sidewall.

3. The hookah of claim 2 wherein said radial actuation of stem protrusions below said neck protrusions longitudinally motions an apex of said stem neck minor sidewall into contact with said stem minor ceiling.

4. The hookah of claim 3 wherein said radial actuation of said stem protrusions below said neck protrusions longitudinally motions said apex of said neck minor sidewall into contact with said stem minor ceiling to insulate said stem protrusions and said neck protrusions from gaseous contact with said plenum.

5. The hookah of claim 1 further comprising a first compressible seal, positioned below said neck protrusions, compressed in said locked position to seal an external environment from said neck protrusions and stem protrusions.

6. The hookah of claim 5 further comprising a second compressible seal positioned above said neck protrusions, compressed in said locked position to seal said plenum from said neck protrusions and stem protrusions.

7. The hookah of claim 1 further comprising a first seal positioned above said neck protrusions, compressed in said locked position to seal said plenum from said neck protrusions and stem protrusions.

8. The hookah of claim 1 wherein said free stem minor sidewall width is entirely greater than said neck stem minor sidewall width.

9. The hookah of claim 8 wherein said free stem minor sidewall and said neck stem minor sidewall include substantially continuous surfaces abutting said neck protrusions and said stem protrusions.

10. A hookah comprising:
  a hookah bottle constructed of a first material and having a bottle neck width;
  a hookah stem, constructed of a second material different from said first material, comprising:

a neck stem segment, overlaid upon said neck, comprising: a neck stem major sidewall greater than said bottle neck width defining a neck shoulder and defining a neck stem major passage with a neck stem major passage width; and a neck stem minor sidewall entirely bounded by said neck stem major sidewall, positioned below said neck stem major sidewall, defining a neck stem minor sidewall passage having a neck stem minor sidewall width, and defining at least two neck protrusions, each having a neck protrusion total length, partially circumscribing less than half of a whole of said neck stem minor sidewall; and a free stem segment, comprising: a free stem floor; a free stem major sidewall, having a free stem major sidewall passage with a free stem major sidewall passage width, defining an internal plenum and a wet smoke aperture; a free stem minor sidewall, positioned below said free stem major sidewall, defining a free stem minor passage having a free stem minor sidewall passage width, defining at least two stem protrusions, of a stem protrusion total length, partially circumscribing less than half of a whole of said free stem minor sidewall, wherein angled radial actuation, of distance less than said stem protrusion total length and said neck protrusion total length, of said stem protrusions below and upon said neck protrusions longitudinally motions said free stem floor into contact with said neck shoulder into a locked position.

11. The hookah of claim 10 further comprising a first seal positioned above said stem protrusions, compressed in said locked position to seal said plenum from said neck protrusions and stem protrusions.

12. The hookah of claim 11 wherein said free stem minor sidewall width is entirely less than said neck stem minor sidewall width.

13. The hookah of claim 12 wherein said free stem minor sidewall and said neck stem minor sidewall include substantially continuous surfaces abutting said neck protrusions and said stem protrusions.

14. A hookah kit comprising:
a hookah bottle constructed of a first material and having a bottle neck with a bottle neck cross-section configuration and a substantially continuous bottle neck sidewall and substantially continuous bottle neck apex;
a hookah stem, constructed of a second material different from said first material, comprising:
a neck stem segment, configured to be overlaid upon said neck, comprising: a neck stem shoulder, and a neck stem sidewall having a neck stem sidewall cross-section configuration comparable to said bottle neck cross-section configuration and a substantially continuous neck stem sidewall configured for flush contact with said bottle neck sidewall, defining a neck stem sidewall passage having a neck stem sidewall width, and defining at least two neck protrusions, each having a neck protrusion total length, partially circumscribing less than half of a whole of said neck stem minor sidewall; and a first free stem segment having a first free stem configuration, comprising: a free stem floor; a free stem major sidewall, having a free stem major sidewall passage with a free stem major sidewall passage width, defining an internal plenum and a wet smoke aperture; a free stem minor sidewall, positioned below said free stem major sidewall, defining a free stem minor passage having a free stem minor sidewall passage width, defining at least two stem protrusions, of a stem protrusion total length, partially circumscribing less than half of a whole of said free stem minor sidewall, wherein angled radial actuation, of distance less than said stem protrusion total length and said neck protrusion total length, of said stem protrusions below and upon said neck protrusions longitudinally motions said free stem floor into contact with said neck shoulder into a locked position and said neck stem segment and said first free stem segment form a substantially continuous and substantially flush external joinder adjacent to said free stem floor and said neck stem shoulder.

15. The kit of claim 14 further comprising a second free stem segment having a second free stem configuration, comprising: a second free stem floor; a second free stem major sidewall, having a second free stem major sidewall passage with a second free stem major sidewall passage width, defining an second stem internal plenum and a second stem wet smoke aperture; a second free stem minor sidewall, positioned below said second free stem major sidewall, defining a second free stem minor passage having a second free stem minor sidewall passage width, defining at least two angled second stem protrusions, of a stem protrusion total length, partially circumscribing less than half of a whole of said second stem minor sidewall, wherein radial actuation, of distance less than said stem protrusion total length and said neck protrusion total length, of said second stem protrusions below and upon said neck protrusions longitudinally motions said second free stem floor into contact with said neck shoulder into said locked position and said neck stem segment and said second free stem segment form a substantially continuous and substantially flush external joinder adjacent to said second free stem floor and said neck stem shoulder.

* * * * *